Jan. 16, 1962  C. BLISS  3,016,624
GAS DISTRIBUTION BAFFLE
Filed Jan. 2, 1959  6 Sheets-Sheet 5

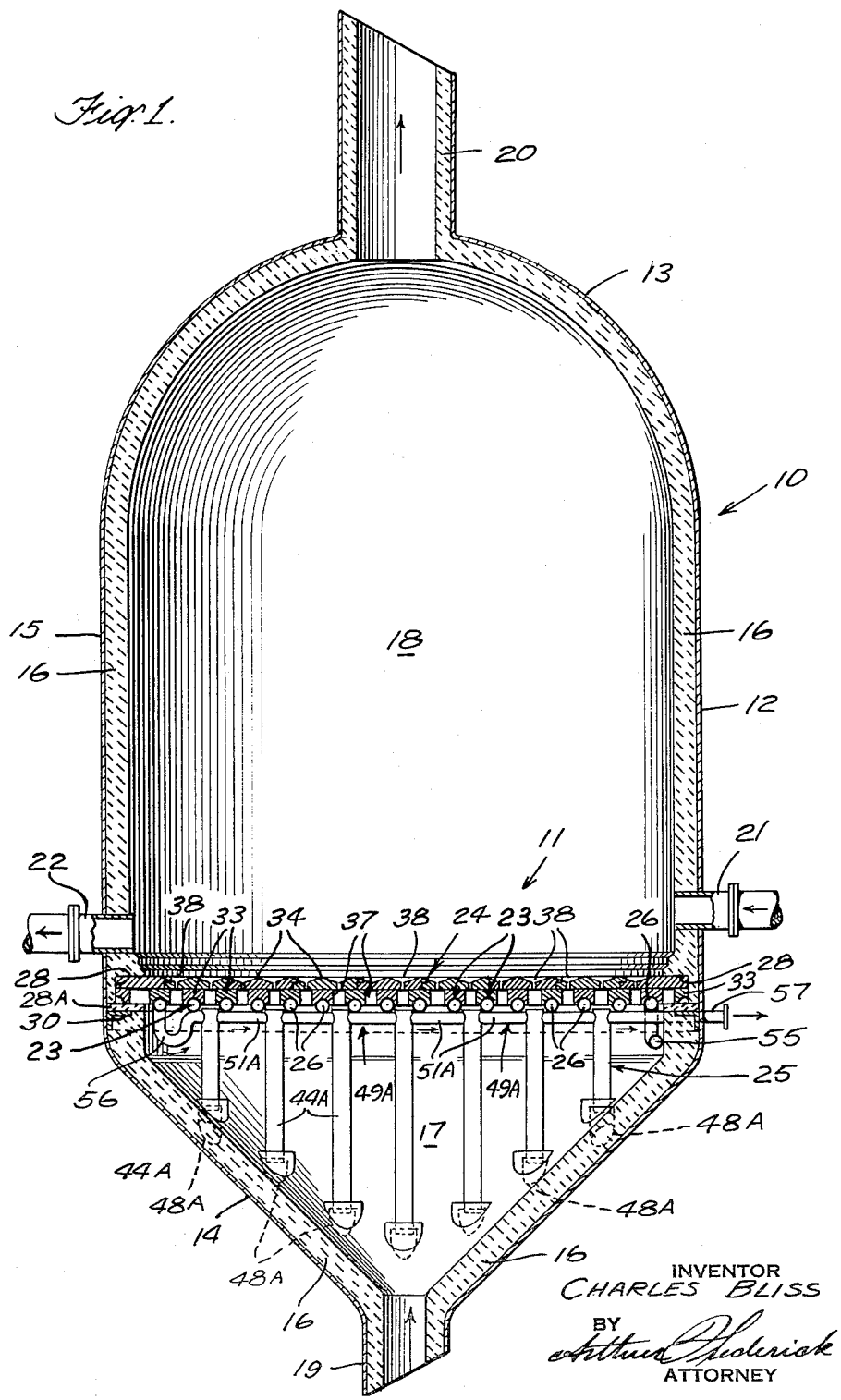

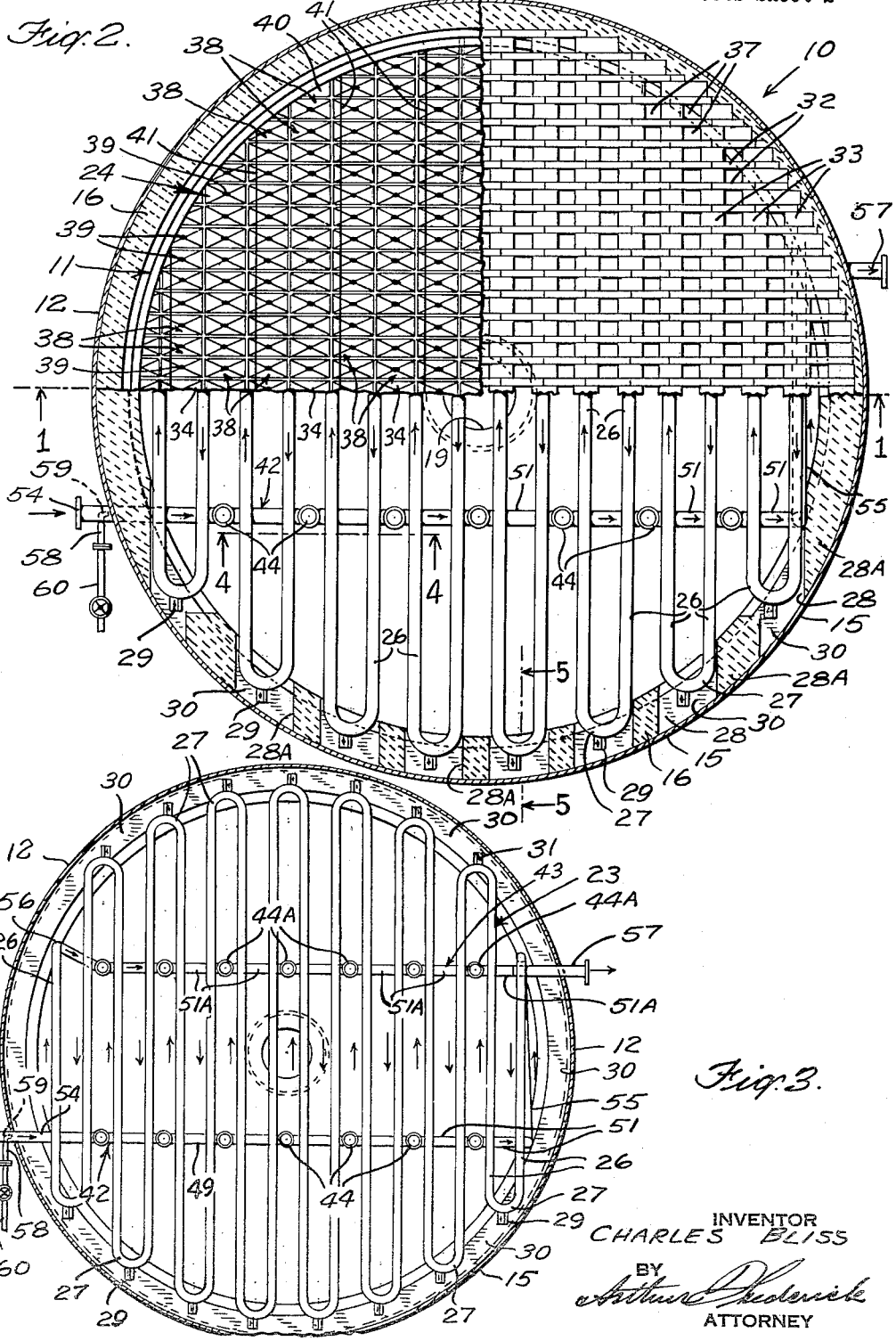

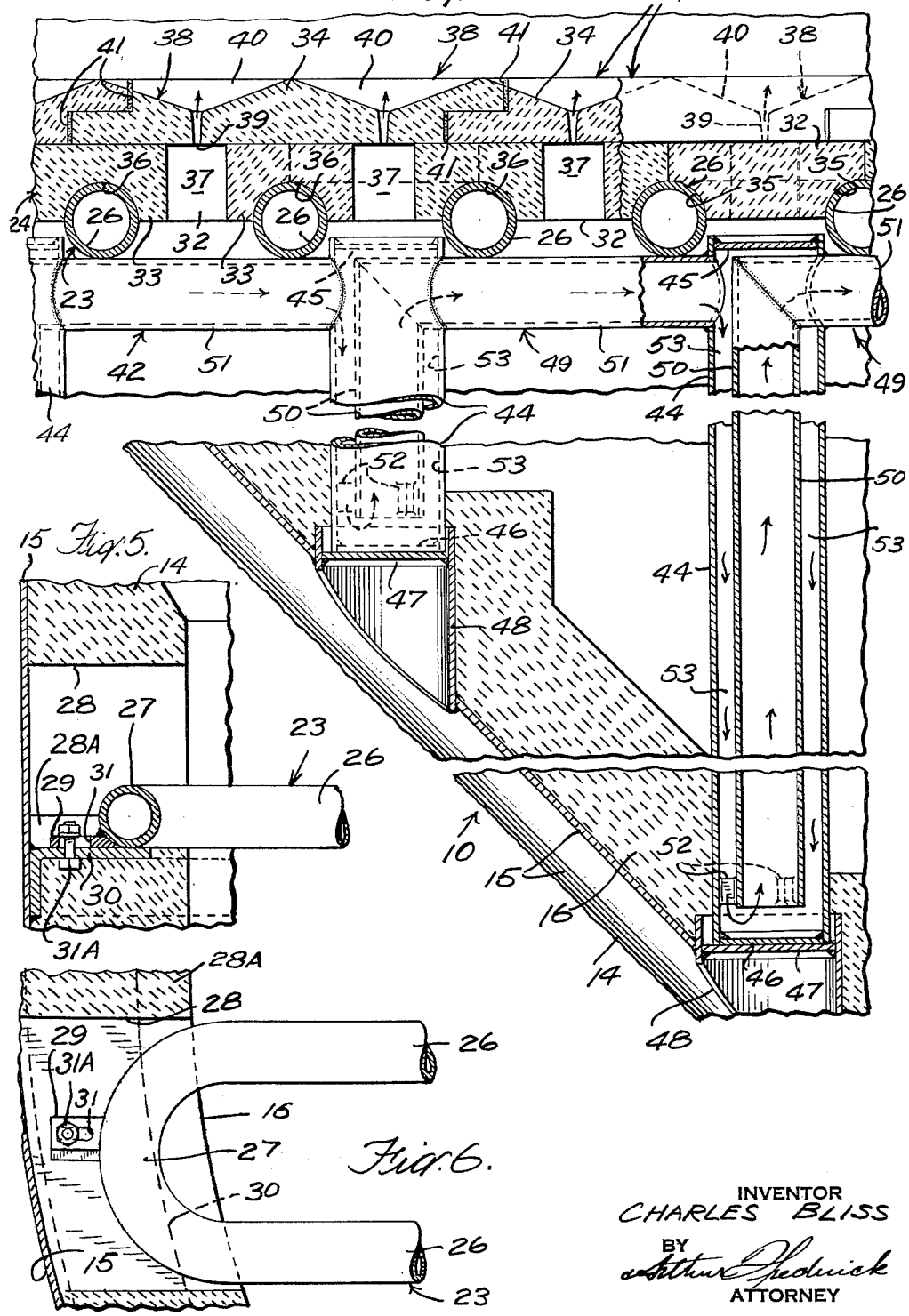

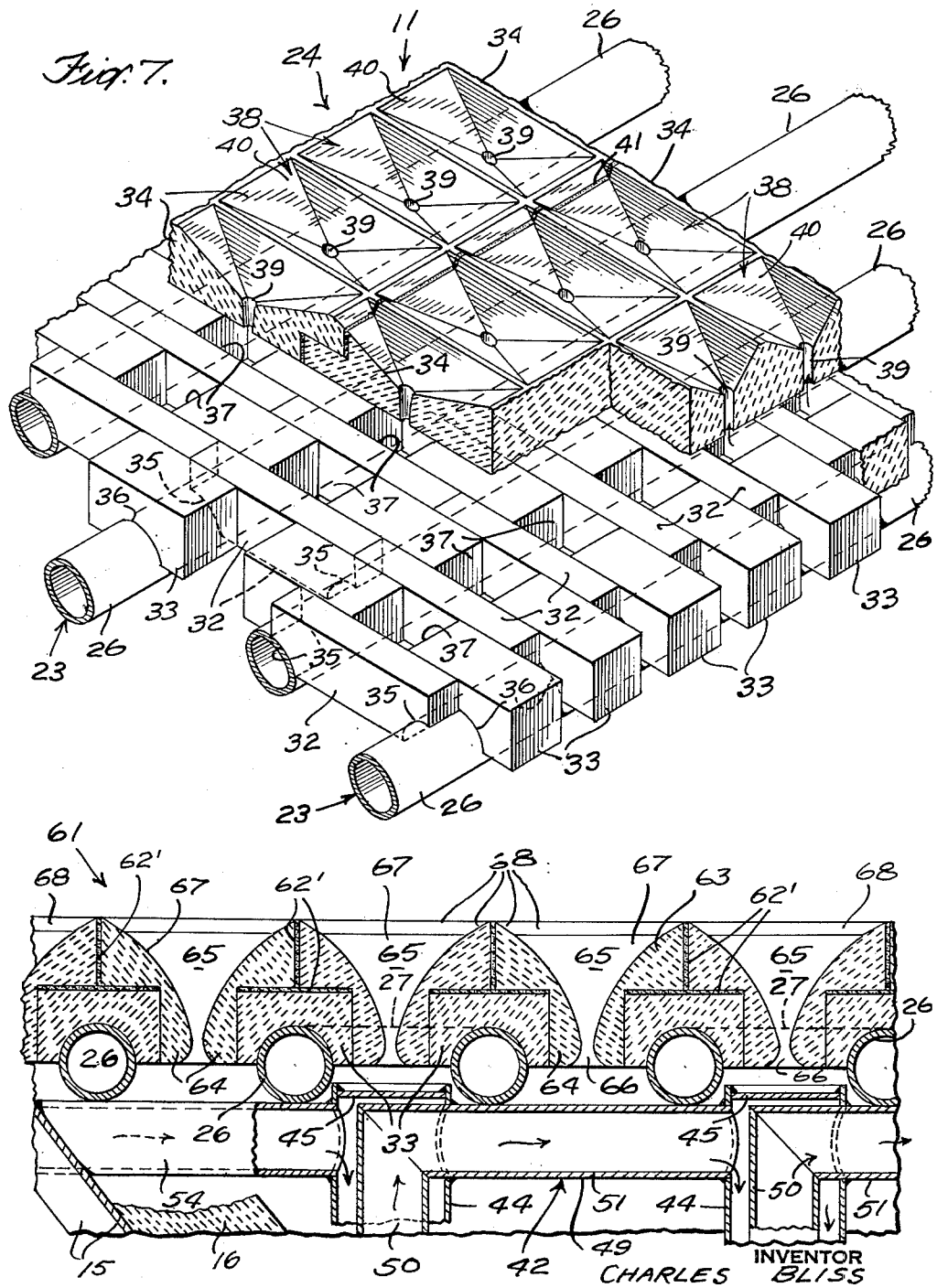

INVENTOR
CHARLES BLISS
BY
Arthur Frederick
ATTORNEY

Jan. 16, 1962  C. BLISS  3,016,624
GAS DISTRIBUTION BAFFLE
Filed Jan. 2, 1959  6 Sheets-Sheet 6

INVENTOR
CHARLES BLISS
BY
ATTORNEY

United States Patent Office 3,016,624
Patented Jan. 16, 1962

3,016,624
GAS DISTRIBUTION BAFFLE
Charles Bliss, Hastings on Hudson, N.Y., assignor to Foster Wheeler Corporation, New York, N.Y., a corporation of New York
Filed Jan. 2, 1959, Ser. No. 784,656
8 Claims. (Cl. 34—57)

This invention relates to fluidized solids apparatus and, more particularly, pertains to a gasiform fluid distribution baffle for effecting intimate contact between a stream of gasiform fluid and a mass of finely divided solid material.

In fluidized solids apparatus, a gasiform fluid distribution baffle is disposed to extend across the flow area of a containing vessel for the purpose of supporting the fluidized solids mass and effecting uniform distribution of the gasiform fluid or fluidizing gas into the fluidized solids mass across the entire flow area of the vessel. To achieve uniform and intimate contact between a gasiform fluid and a mass of finely divided solid material, gasiform fluid distribution baffles have been constructed of metal having a dome or dish shaped configuration and having perforations so spaced and of such size that a uniform gasiform fluid velocity is effected over the entire fluidized solids mass. In some industrial applications, as for example, in the metallurgical industry, fluidized solids apparatus operate at temperatures in excess of those temperatures for which ordinary metallic materials are available. Therefore, where high operating temperatures are encountered, for example, 1,500° F. and above, gasiform fluid distribution baffles of refractory material have been employed, which refractory baffles are of either dome shaped construction or cantilever-like bridge construction and having a plurality of spaced gasiform fluid passageways therein. A major disadvantage of the refractory baffle constructions is that the size of the baffles is limited to a maximum diameter of approximately 24 feet due to the structural properties of refractory material at high temperatures. Another disadvantage of the refractory baffles is that the gasiform fluid passageways through the baffle vary in length due to the non-uniform thickness of the baffles and therefore require a complex arrangement of passageways of various diameters and spacings to achieve uniform gasiform fluid flow through the baffle and into the fluidized solids mass.

Accordingly, it is an object of this invention to provide a gasiform fluid distribution baffle capable of withstanding relatively high operating temperatures without deterioration and failure. Another object is to provide a gasiform fluid distribution baffle which can be constructed of any desirable size. A further object of the present invention is to provide a gasiform fluid distribution baffle of relatively simple and inexpensive construction and capable of effecting uniform gasiform fluid distribution into the fluidized solids mass. A still further object of this invention is to obviate residual flat areas above the baffle on which solids in incipient state of fusion will accumulate, fuse and tend to obstruct the gasiform fluid passageways of the baffle.

The present invention contemplates a novel gasiform fluid distribution baffle assembly in a vessel for contacting a mass of finely divided solid material with a stream of gasiform fluid, which baffle comprises a tubular grid disposed horizontally in the vessel and a refractory floor disposed on and supported by the tubular grid to divide the interior of said vessel into a gasiform fluid inlet chamber and a solids contacting chamber. The refractory floor engages the tubular grid structure in such manner that relative movement between tubular grid and the refractory floor is permitted. The refractory floor is of uniform cross-section and constructed and arranged to provide a plurality of closely spaced passageways of like configuration and spacing, each of which passageways communicates at one end with the gasiform fluid inlet chamber and at the opposite end with the solids contacting chamber to provide for flow of gasiform fluid from the gasiform fluid inlet chamber into the solids contacting chamber. A tubular support structure may be provided in large diameter vessels, which support structure is disposed in the gasiform fluid inlet chamber in contact with the tubular grid assembly to support the latter and the refractory floor, the tubular support structure being connected to and supported by the vessel. The tubular support structure is connected to a source of cooling fluid to receive the same for flow therethrough and to the tubular grid assembly to deliver cooling fluid to said tubular grid assembly for flow through the latter. The cooling fluid in flowing through the tubular support structure and the tubular grid assembly absorbs heat from the refractory floor and the component parts of the tubular support structure to obviate failure of the latter and tubular grid assembly due to high thermal stresses to which the structures may be subjected. The cooling fluid contemplated by this invention, as for example saturated steam, may be a vapor containing sufficient droplets in suspension so that all of the heat absorbed by the tubular grid assembly and support structure would be used to evaporate the liquid in suspension to thus maintain the tubular grid assembly and support structure at uniform temperature and thermal expansion.

It is contemplated by this invention that the refractory floor may be constructed of a first section and a second section superimposed on the first section. The first section comprising a plurality of refractory bricks adapted to seat upon the tubular grid elements and constructed and arranged to define therebetween a plurality of closely spaced openings. The second floor section may consist of a plurality of refractory slabs each of which is provided with a plurality of closely spaced vertical passageways extending therethrough. The refractory slabs of the second section are constructed and arranged so that each of the passageways thereof registers with an opening in the first section to thereby communicate the solids contacting chamber with the gasiform fluids inlet chamber.

In a first embodiment, the tubular support assembly consists of two spaced parallel support members, one of which is connected to a source of cooling fluid and to the tubular grid structure to receive cooling fluid and deliver the same to the tubular grid assembly, while the other support member is connected to the tubular grid assembly to receive cooling fluid from the latter and connected to discharge cooling fluid after flow therethrough.

In a second embodiment of this invention, while comprising a first floor section which is constructed and arranged on the tubular grid assembly in the same manner as in the first embodiment, has a second floor section consisting of a plurality of refractory bricks rather than refractory slabs. The refractory bricks of the second section are each provided with a reduced body portion which is adapted to fit within the openings formed between the refractory bricks of the first section and, when so disposed, lie in abutting relationship to each other above the refractory bricks of the first section. In addition, each of the refractory bricks of the second floor section is provided with a vertical passageway having a relatively small inlet opening and a relatively large outlet opening, the passageways communicating with the solids contacting chamber and the gasiform fluid inlet chamber to provide for flow of gasiform fluid from the latter into the solids contacting chamber.

In a third embodiment of this invention, the tubular support structure is circular in construction rather than comprising two spaced parallel support members as in the first embodiment of this invention. In this embodiment, the cooling fluid flows through the tubular support structure, thence into the tubular grid structure from where it is discharged. Although for illustration purposes the tubular support assembly of this third embodiment is shown with a refractory floor according to the second embodiment of this invention, it is not limited thereto but may be employed with a refractory floor according to the first embodiment of this invention.

The invention will be more fully understood from the following detailed description thereof when considered in connection with the accompanying drawing wherein three embodiments of the invention are illustrated by way of example and in which:

FIG. 1 is a vertical cross sectional view taken substantially along line 1—1 of FIG. 2 of a fluidizing solids apparatus according to this invention;

FIG. 2 is a horizontal sectional view of the apparatus of FIG. 1 with parts broken away for illustration purposes;

FIG. 3 is a horizontal sectional view, similar to FIG. 2, but on a reduced scale showing the tubular grid assembly and tubular support structure according to this invention;

FIG. 4 is an enlarged fragmentary view in section taken substantially along line 4—4 of FIG. 2;

FIG. 5 is an enlarged fragmentary sectional view taken substantially along line 5—5 of FIG. 2 showing the means for connecting the end portions of the tubular grid elements to the vessel;

FIG. 6 is a plan view of the means for connecting the end portions of the tubular grid to the vessel;

FIG. 7 is a fragmentary view, in perspective, of the refractory floor structure according to a first embodiment of this invention;

FIG. 8 is a cross sectional view of the refractory floor according to a second embodiment of this invention;

Figure 9:
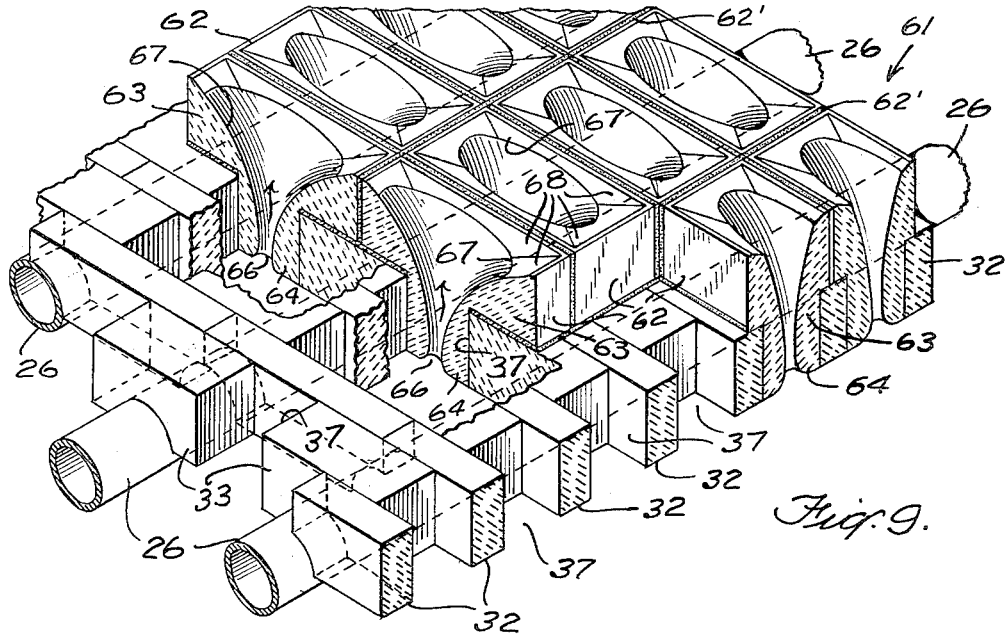
FIG. 9 is a fragmentary view, in perspective, of the refractory floor structure shown in FIG. 8.

Referring now to the drawings, and more specifically to FIGS. 1 to 6, the reference numeral 10 designates a vessel of a fluidized solids apparatus having a gasiform fluid distribution baffle assembly 11 according to this invention. Vessel 10 comprises a vertically extending cylindrical wall 12 which is closed at the opposite ends by a dome-shaped top wall 13 and an inverted frusto-conical shaped bottom wall 14. Walls 12, 13 and 14 of vessel 10 comprise a metallic shell 15 which is internally lined with refractory material 16.

Distribution baffle assembly 11 is disposed horizontally in vessel 10 at a point in spaced relationship with bottom wall 14 of the vessel to thereby divide the interior of vessel 10 into a gasiform fluid inlet chamber 17 and a solids contacting chamber 18.

A gasiform fluid inlet connection 19 is provided in the bottom wall 14 of vessel 10, which inlet provides for the flow of gasiform fluid into inlet chamber 17. In the center of top wall 13 of vessel 10, a gasiform fluid outlet connection 20 is provided for the removal of gasiform fluid after the reaction thereof with finely divided solids in solids contacting chamber 18. Finely divided solids are introduced into solids contacting chamber 18 through an inlet connection 21 which is connected to and extends through cylindrical wall 12 at a point above distribution baffle assembly 11. Diametrically opposite inlet connection 21, an outlet connection 22 is provided in cylindrical wall 12 of vessel 10 through which finely divided solids are removed from the solids contacting chamber 18 after reaction with the gasiform fluid.

Distribution baffle assembly 11 is composed of three major sub-assemblies; a tubular grid assembly 23, a refractory floor 24, and a tubular support structure 25.

Tubular grid assembly 23 consists of a plurality of tubular members 26 which are arranged in a horizontal plane in spaced parallel relationship to each other across the flow area of vessel 10. As best shown in FIG. 3, tubular members 26 are interconnected by U-bend portions 27 to provide for series flow of fluid therethrough. Tubular members 26 are dimensioned so that the U-bend portions 27 extend into an annular recess 28 in the inner surface of refractory lining 16 of vessel 10 to thereby permit free longitudinal expansion of tubular members 26 within the vessel.

The end portions of tubular members 26 which substantially overhang tubular support structure 25 are supported and secured against lateral displacement by plates 29 which are secured at one end, as by welding, to U-bend portions 27 of said tubular members 26. As best shown in FIGS. 5 and 6, plate 29 extends into annular recess 28 in refractory lining 16 and rests upon an annular flange 30 which is secured to shell 15 of the vessel. Each plate 29 is provided with an elongated opening or slot 31 which registers with a hole in flange 30. A bolt 31A is passed through the hole in flange 30 and slot 31 and a nut is tightened upon bolt 31A to secure the plate 29 and flange 30 together but not tight enough to prevent relative movement between plate 29 and flange 30 upon longitudinal expansion or contraction of tubular members 26. Lateral movement of plate 29, with respect to flange 30, is prevented by bolt 31A impinging the sides of slot 31 to thereby obviate lateral displacement of tubular members 26 in vessel 10.

As best illustrated in FIGS. 2, 4 and 7, refractory floor 24 is disposed on and is supported by the tubular grid assembly 23. Refractory floor 24 comprises a first floor section composed of a plurality of refractory bricks 32 and 33 and a second floor section consisting of a plurality of refractory slabs 34.

Each of the refractory bricks 32 of the first floor section are rectangular in cross section and are of a length equal to the center to center spacing of tubular members 26. The opposite lower end edges of each refractory brick 32 are provided with arcuate-shaped cut-out portions 35 which are dimensioned to receive a sector of the peripheral surface of tubular members 26. Refractory bricks 32 are disposed so that each refractory brick 32 spans and seats upon two adjacent tubular members 26 and are arranged on the tubular members 26 in spaced parallel rows with the refractory bricks of each row in end-wise abutment with each other.

Refractory bricks 33 of the first floor section are each provided on the underside thereof with a centrally disposed arcuate recess 36 which is adapted to receive therein a sector of the peripheral surface of tubular members 26. The length of each refractory brick 33 is substantially less than the spacing between tubular members 26 so that, when refractory bricks 33 are disposed on tubular members 26 with the latter seated in recesses 36, the end faces of adjacent refractory bricks 33 are spaced from each other. As illustrated, refractory bricks 33 are arranged on tubular members 26, in rows alternating with the rows of refractory bricks 32, and in abutment against refractory bricks 32. Since the end faces of refractory bricks 33 are spaced from each other, a plurality of spaced rectangular shaped openings 37 are defined between refractory bricks 32 and 33. As best shown in FIGS. 1 and 2, refractory bricks 32 and 33, at the periphery of the first floor section are dimensioned to extend into annular recess 28 in lining 16 and are supported by the refractory segments 28A of said recess, which segments 28A rest on flange 30 and are disposed between adjacent U-bend portions 27 of tubular members 26. The aforesaid peripheral refractory bricks 32 and 33 are suitably formed to rest upon the U-bend portions 27 of tubular members 26 and permit free movement of U-bend portions 27 and plates 29 on flange 30.

Slabs 34 of the second floor section are provided with a plurality of closely spaced passageways 38 which have a relatively small inlet portion 39 and a flared outlet portion 40. The walls defining outlet portion 40 of passageways 38, slope upwardly and outwardly toward the next adjacent passageway 38 so that a negligible flat surface is formed between adjacent passageways whereby accumulation of finely divided solids on the floor is obviated. Slabs 34 are arranged on the top of refractory bricks 32 and 33 so that the pasageways 38 of slabs 34 register with openings 37. As best shown in FIGS. 4 and 7, the adjacent edges of slabs 34 are adapted to overlap each other and are dimensioned to provide a space 41 between the edge of one slab and the edge of the next adjacent slab to allow relative expansion of slabs 34. As shown, compressible packing material may be disposed in space 41 to insure that no gasiform fluid will by-pass passageways 38. Slabs 34 have their edge portions which are adjacent the vessel wall curved to conform to the curvature of the vessel wall and extend into annular recess 28 in refractory lining 16.

Tubular support structure 25 comprises an inlet portion 42 and an outlet portion 43 which extend normal to the longitudinal axes of tubular members 26 of tubular grid assembly 23.

Inlet portion 42 consists of a plurality of spaced upright tubular support legs 44 which are closed at the top and bottom by walls 45 and 46, respectively. As best shown in FIG. 4, support legs 44 abut at their lower ends a plate 47 which is welded, or otherwise suitably secured, in tubes 48. Tubes 48 are secured at one end to the metal shell 15 of bottom wall 14 of vessel 10 and extend vertically toward the interior of vessel 10. Each tubular support leg 44 is connected to the next adjacent tubular support leg 44 by an inverted L shaped tubular member 49 which is of smaller outside diameter than the inside diameter of tubular legs 44. The vertical leg 50 of tubular member 49 is disposed coaxially within a leg 44 while the other leg 51 extends horizontally and is connected at its distal end to the next adjacent tubular support leg 44. As shown, each of the vertical legs 50 is provided with radially extending lugs 52 to maintain vertical leg 50 in spaced coaxial relationship with the tubular leg 44 whereby an annular passageway 53 is defined between the outer surface of vertical leg 50 and the inner surface of tubular leg 44. The bottom of leg 50 is spaced from bottom closure wall 46 of tubular leg 44 so that annular passageway 53 communicates with the interior of tubular member 49 and flow of fluid from passageway 53 into vertical leg 50 of tubular member 49 is provided. Horizontal leg 51 of tubular member 49 extends through an opening in the upper portion of a tubular leg 44 and is sealed within said opening in a fluid tight manner, as for example by welding, while the opposite or distal end of horizontal leg 51 is connected, as by welding, within an opening in the upper portion of the next adjacent tubular leg 44 so that the interior of tubular member 49 is in communication with annular passageway 53 of said next tubular leg 44.

As shown in FIGS. 2 and 3, an inlet pipe 54, which extends through wall 12 of the vessel 10, is connected at one end to a source of cooling fluid (not shown) and at the opposite end is connected, in a fluid tight manner, within an opening in the upper portion of a first tubular support leg 44 so that the interior of pipe 54 communicates with annular passageway 53 of the first tubular support leg 44. The other end of inlet portion 42, opposite from inlet pipe 54, communicates with a first tubular member 26 of tubular grid assembly 23 by means of a connecting pipe 55. Pipe 55 is connected at one end to horizontal leg 51 which is associated, with respect to the direction of cooling fluid flow, with the last tubular support leg 44, and at the other end to the distal end of said first tubular member 26.

The construction of outlet portion 43 of the tubular support structure 25 is similar to that of the inlet portion 42 and therefore will not be described in detail. Accordingly, component parts of outlet portion 43, corresponding to like parts of inlet portion 42, will be designated by the same reference numerals but having a suffix A added thereto. Outlet portion 43 is connected with respect to direction of cooling fluid flow to a last tubular member 26 of tubular grid assembly 23 by a connecting pipe 56 which is joined at one end to the distal end of said last tubular member 26 and at the opposite end is connected, in a fluid tight manner, within an opening in a first tubular support leg 44A of outlet portion 43. An outlet pipe 57 is secured at one end to the distal end of horizontal leg 51A of tubular member 49A which is associated with a last tubular support leg 44A of outlet portion 43. Outlet pipe 57 projects through wall 12 of vessel 10 to piping (not shown) for discharge of cooling fluid.

As best shown in FIGS. 1, 2 and 4, tubular support legs 44 and 44A are positioned to extend between tubular members 26 and are dimensioned so that each horizontal leg 51 and 51A of tubular members 49 and 49A of the respective inlet and outlet portions 42 and 43 contact the undersurfaces of the adjacent tubular members 26 to support the latter.

In operation of the apparatus, gasiform fluid at a relatively high temperature, as for example flue gas, is delivered from a suitable source thereof into inlet connection 19 of vessel 10 from where the gas passes into inlet chamber 17 of the vessel. At the same time, a finely divided solid material, as for example iron ore, is introduced into solids contacting chamber 18 of vessel 10 through inlet connection 21. The gasiform fluid flows upwardly in inlet chamber 17 and impinges against distribution baffle assembly 11 and is distributed across the entire area of baffle assembly 11. The gasiform fluid then enters openings 37 in the first floor section of refractory floor 24 and thence passes through passageways 38 of the second floor section of refractory floor 24 into the finely divided iron ore in contact chamber 18. Since all of the openings 37 and all the passageways 38 are of uniform length and cross-sectional dimension, equal quantities of gasiform fluid flow through each aligned opening 37 and passageway 38 so that an equal pressure drop exists for each aligned opening 37 and passageway 38, to thereby achieve uniform gas velocity into contact chamber 18. Furthermore, since passageways 38 have relatively large flared outlet portions 40, there are no flat surfaces that are not swept by the gas flowing from passageways 38 and upon which solids may accumulate. In addition, the flared outlet portions 40 of passageways 38 permit conversion of the bulk of gasiform fluid velocity pressure into gasiform fluid static pressure uniformly across the outlets 40 at the floor. After reaction of the gasiform fluid with the finely divided solids, the solid reaction product is withdrawn from contact chamber 18 through outlet connection 22, while additional quantities of finely divided solids and gasiform fluid are introduced into contact chamber 18 through the respective inlet connections 21 and 19. Gaseous reaction products, as for example, carbon dioxide and water vapor, are withdrawn from the top of chamber 18, through outlet connection 20 along with some finely divided material entrained in the gaseous reaction products, where external separation means (not shown) may be provided to separate the solids from the gaseous products.

Simultaneously, with the flow of gasiform fluid and finely divided solids into vessel 10, cooling fluid, such as saturated steam, is passed into inlet pipe 54 of tubular support structure 25 from a suitable source of steam, as shown in FIGS. 2 and 3. To maintain the incoming steam at saturation, water or preferably condensate is injected into the steam, as required, by means of a suitable water injection assembly 58 which is connected to inlet pipe 54. Injection assembly 58 has a nozzle 59 which is connected through a valved line 60, to a suitable source of water. The saturated steam flows from inlet pipe 54 into the annular passageway 53 of a first tubular support leg 44 and thence downwardly in annular passageway 53. Thereafter, the saturated steam flows into the lower end of vertical leg 50 of tubular member 49 and upwardly therein and into horizontal leg 51. After flow of steam through horizontal leg 51, it passes into and through the annular passageway 53 of the next adjacent support leg 44 and thence into the lower end of vertical leg 50 of the next adjacent inverted L shaped tubular member 49. The steam continues to flow successively through the remaining support legs 44 and tubular members 49 until the steam enters connecting pipe 55 which passes the steam to a first tubular member 26 of tubular grid assembly 23. From said first tubular member 26, the steam flows successively through the other tubular members 26 into a last tubular member 26 and thence into connecting pipe 56. Thereafter, the steam flows from connecting pipe 56 into a first tubular leg 44A of outlet portion 43 of tubular support structure 25. The steam then flows through successive support legs 44A of outlet portion 43 of tubular support structure 25. The steam flows through successive support legs 44A and tubular members 49A in the same manner as it flowed through tubular members 49 and support legs 44 of inlet portion 42. From a last tubular member 51A, the steam passes into outlet pipe 57 for discharge. The steam in passing through the tubular support structure 25 and tubular grid assembly 23 absorbs heat from the refractory floor and the tubular components of assemblies 23 and 25 which heat acts to evaporate moisture in the steam at substantially constant pressure so that steam flow through the said assemblies is isothermal at a temperature determined by the steam pressure, which temperature is substantially below the maximum temperature the tubular components are capable of withstanding without failure. The injection of water or condensate into the incoming steam, to keep the steam in a saturated state, is for the purpose of compensating for the heat absorbed by the steam in flowing through the tubular support structure 25 and tubular grid assembly 23 and avoids strains in the tubular components of assemblies 23 and 25, caused by differential expansion of tubular components of assemblies 23 and 25 due to differences thereof in temperature, by maintaining the temperature of the tubular components of said assemblies substantially uniform. However, there will be some differential expansion due to the difference in length and material of the members which are compensated for by allowing relative movement of the tubular grid assembly 23 with respect to refractory floor 24 and tubular support structure 25, and with respect to vessel 10.

Since the saturated steam absorbs heat in flowing through tubular support structure 25 and tubular grid assembly 23, the steam temperature may be elevated above its saturation temperature if all of the water therein is evaporated and therefore it may be necessary under certain operating conditions to provide for water or condensate injection into the steam, at one or more other points (not shown) in its flow through assemblies 23 and 25.

Figure 10:
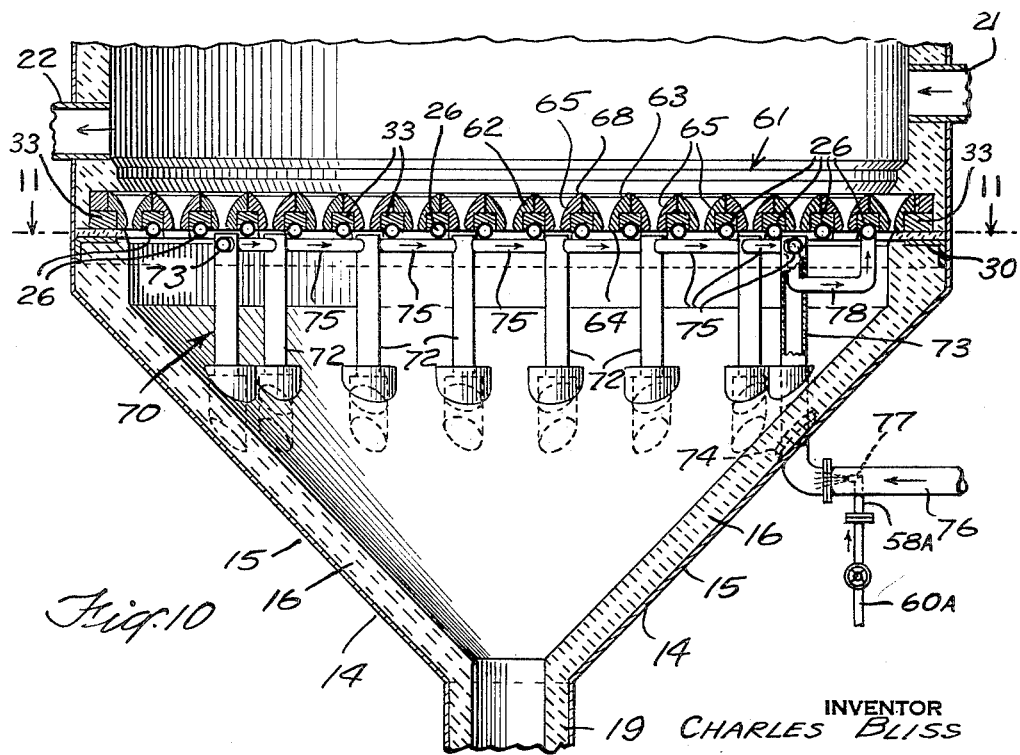
FIG. 10 is a cross sectional view in elevation, similar to FIG. 1, showing a distribution baffle assembly according to a third embodiment of this invention.

In a second embodiment of the present invention, a refractory floor 61 is shown in FIGS. 8, 9 and 10 which floor comprises a first floor section of the same construction as the first floor section of refractory floor 24. However, the second floor section of refractory floor 61 is composed of a plurality of refractory bricks 62 rather than refractory slabs 34 as shown in FIGS. 1 to 7. Each refractory brick 62 has a large rectangular shaped portion 63 and an integral, reduced body portion 64 which is shaped to fit snugly within openings 37 of the first floor section. A passageway 65 is provided in each refractory brick 62 which passageway 65 extends centrally through reduced body portion 64 and portion 63. Passageway 65 has a relatively small inlet 66, in reduced body portion 64, and flares outwardly to a relatively large elliptical shaped outlet 67. To minimize the size of the flat surfaces or "dead" areas between adjacent refractory bricks upon which finely divided material may accumulate, bricks 62 are provided with inclined surfaces 68 which extend downwardly and inwardly from the top edges of body portion 63 to elliptical outlet 67 of passageway 65. The surfaces of passageway 65 may have a Venturi configuration to reduce pressure drop in the fluid flowing therethrough. However, it is contemplated by the present invention that passageways 65 of refractory bricks 62 may have a cross-sectional configuration other than that described above, as for example, passageways 65 may flare outwardly directly into a large rectangular opening to thus eliminate inclined surfaces 68, or may have a polygonal configuration in various horizontal cross sections. The second floor section of refractory floor 61 is constructed by positioning the refractory bricks 62 with the reduced body portions 64 in openings 37 of the first floor section and the surfaces of the portions 63 in abutment against the surfaces of portions 63 of the next adjacent refractory bricks 62.

As shown in FIGS. 8 and 9, the second floor section of refractory floor 61 may be provided with compressible packing material 62' disposed between the adjacent surfaces of the refractory bricks 62 and between the adjacent surfaces of bricks 62 and bricks 32 and 33 of the first floor section to seal the spaces between the bricks and thereby insure that no gasiform fluid will by-pass passageways 65. To prevent gasiform fluid from by-passing the distribution baffles according to this invention, packing material (not shown) which is compressible may be disposed in the annular recess 28 and between the segments 28A thereof adjacent the U bend portions 27 of tubular members 26.

The refractory slabs 34 and the refractory bricks 65 are not cemented together or to the refractory bricks 32 and 33 so that one or more defective slabs or bricks may be readily removed and replaced. The weight of the individual bricks 65 or slabs 34 is sufficient to off-set the relatively small pressure differential between inlet chamber 17 and solids contact chamber 18 and thereby prevents bricks 65 or slabs 34 from being lifted from the surfaces of refractory bricks 32 and 33 of the first floor section.

Figure 11:
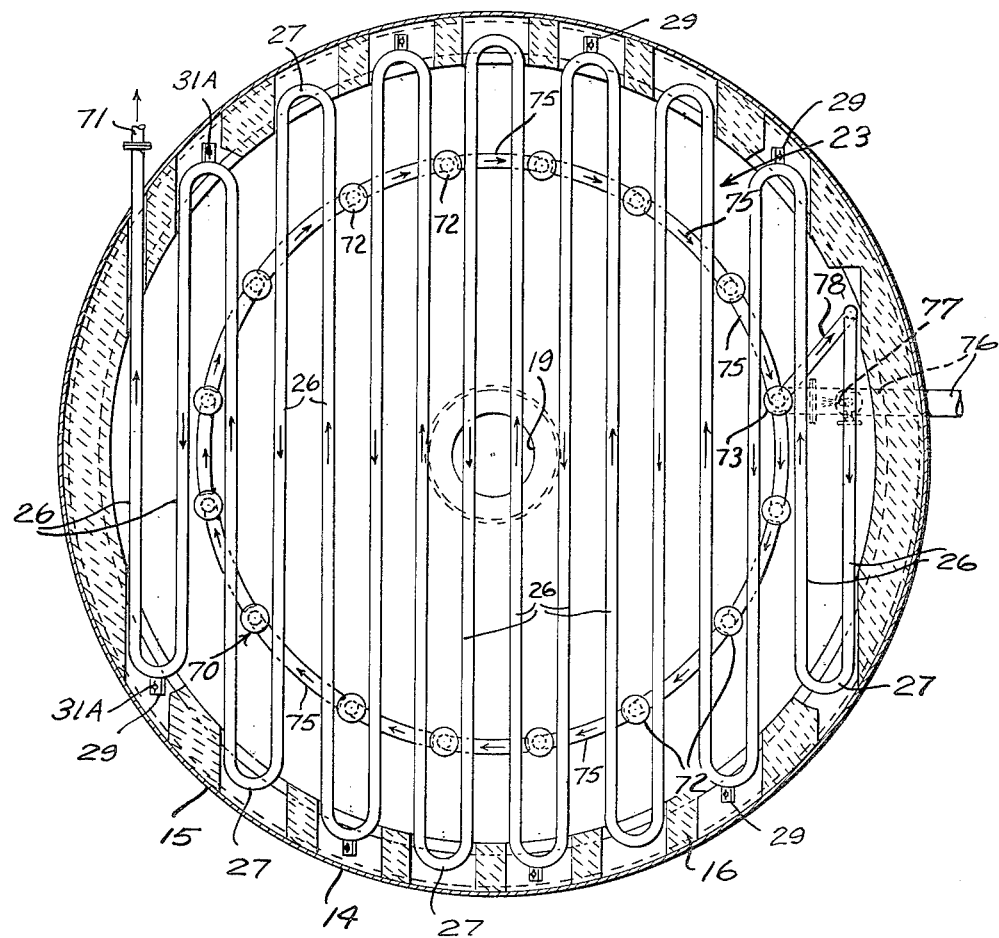
FIG. 11 is a horizontal sectional view, similar to FIG. 3, taken on line 11—11 of FIG. 10.

In FIGS. 10 and 11, a gasiform fluid distribution baffle assembly according to a third embodiment of this invention is shown. This distribution baffle assembly is similar in construction to distribution baffle assembly 11 except that it comprises a tubular support structure 70 which differs from tubular support structure 25 of distribution baffle assembly 11 and, for illustration purposes only, is provided with a refractory floor 61. In addition, the tubular grid assembly 23 of this embodiment is modified by connecting the last tubular member 26, with respect to the direction of flow of cooling fluid, to an outlet pipe 71.

Tubular support structure 70 comprises a plurality of tubular support legs 72 and an inlet support leg 73 which are circumferentially spaced from each other (see FIG. 11). Each of the tubular support legs 70 is supported by bottom wall 14 of the vessel in the same manner as support legs 44 and 44A of baffle assembly 11, while support leg 73 extends through bottom wall 14 of the vessel and is supported by an annular collar 74 which is secured to said support leg 73 and bears against and is welded, or otherwise suitably secured in a fluid tight manner, to the inner surface of shell 15 of the vessel. Since the support legs 72 are arranged circumferentially, they join bottom wall 14 in the same plane and therefore are of the same length. As in tubular support structure 25, support legs 72 and inlet support leg 73 are interconnected by a plurality of inverted L shaped tubular members 75 which are similar in construction to tubular members 49. In addition, tubular members 75 cooperate with support legs 72, in the same manner as tubular members 49, support legs 44 and 44A cooperate with each other, to provide for series flow of fluid therethrough. The horizontal legs of tubular members 75, upon which tubular members 26 rest, may be arcuate shaped, as shown in FIG. 11, although they may be straight.

Support leg 73 is connected at its lower end to an inlet pipe 76 to receive cooling fluid, such as saturated steam, from the latter. Inlet pipe 76 is provided with an injection assembly 58A having a nozzle 77 for injecting water or condensate in the steam, when required, to maintain the steam in a saturated state (see FIG. 10). Assembly 58A is connected through a valved line 60A to source of cooling fluid (not shown).

To flow cooling fluid into tubular grid assembly 23, a connecting pipe 78 is connected at one end to the horizontal leg of a last tubular member 75 to receive cooling fluid from the latter. Connecting pipe 78 extends into and downwardly a short distance in inlet support leg 73, thence projects through said support leg 73, and is connected to the end of a first tubular member 26 of tubular grid assembly 23 to deliver cooling fluid to the latter.

In operation of the distribution baffle assembly according to this third embodiment, cooling fluid is delivered to the lower end of inlet support leg 73 by inlet pipe 76 and flows upwardly in support leg 73. The cooling fluid then passes from support leg 73 into and through a tubular member 75 and into a next adjacent tubular support leg 72 positioned in a clockwise direction from support leg 73 as viewed in FIG. 11. Thereafter cooling fluid flows successively, in a clockwise direction, through support legs 72 and tubular members 75 and flows from a last tubular member 75 into connecting pipe 78. From connecting pipe 78, the cooling fluid flows serially through tubular members 26 and into outlet pipe 71 from where it is discharged.

From the foregoing disclosure, it can be readily seen that a gasiform fluid distribution baffle assembly has been provided which is not limited in size and which effects uniform and continuous fluid velocity over the entire cross section of the fluidized solids vessel. Furthermore, the distribution baffle assembly of this invention is capable of withstanding higher operating temperatures than conventional distribution baffles.

Although several embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. In a vessel for contacting a mass of finely divided solid material with an upwardly moving gasiform fluid, a gasiform fluid distribution baffle comprising, a metallic tubular grid disposed horizontally in said vessel in spaced relationship with the bottom of said vessel, means for connecting said grid to said vessel and allowing differential expansion between said grid and vessel, a metallic tubular support member disposed between said tubular grid and the bottom of vessel and engaging said grid inwardly of the periphery of the grid for supporting said grid, a refractory floor disposed on and supported by said grid to divide said vessel into a solids contacting chamber and a gasiform fluid inlet chamber, said refractory floor being provided with a plurality of spaced passageways communicating the solids contacting chamber with the gasiform fluid inlet chamber to provide for flow of gasiform fluid from the latter into the solids contacting chamber, said floor being adapted to engage said grid so that differential expansion between said grid and said floor is permitted, said tubular support member having an inlet portion and outlet portion, the inlet portion being connected to a source of cooling fluid to receive the same for flow therethrough, said tubular grid being connected to the inlet portion of said tubular support member to receive cooling fluid for flow through said grid to absorb heat from said refractory floor and to said outlet portion of the tubular support member to pass cooling fluid thereto for discharge.

2. In a vessel for contacting a mass of finely divided solid material with a moving gasiform fluid, a gasiform fluid distribution baffle comprising, a refractory floor disposed in said vessel and extending across the flow area of said vessel to divide the latter into a gasiform fluid inlet chamber and a solids contacting chamber, said floor being provided with a plurality of closely spaced passageways communicating the solids contacting chamber and the gasiform fluid inlet chamber to permit flow of gasiform fluid from the latter into the solids contacting chamber, a metallic cooling coil disposed horizontally in said fluid inlet chamber and loosely engaging said refractory floor to support the latter and permit relative movement between the cooling coil and refractory floor, said cooling coil having an inlet to receive cooling fluid for flow thereof through said coil to absorb heat from said refractory floor and having an outlet for discharging cooling fluid, means for connecting said cooling coil to said vessel and for allowing relative movement between the coil and said vessel, a metallic tubular support structure engaging said cooling coil inwardly of the periphery of the cooling coil and connected to said vessel to support said cooling coil, said tubular support structure being provided with a plurality of pendant leg portions, each of said pendant leg portions being connected to the bottom of said vessel, said tubular support structure having an inlet for receiving cooling fluid from a source thereof and connected to said cooling coil inlet to pass cooling fluid to said cooling coil inlet for flow thereof through said cooling coil, said tubular support structure being connected to said cooling coil outlet to receive cooling fluid discharged from the latter, and said tubular support structure having an outlet to discharge heated cooling fluid.

3. In a vessel for contacting a mass of finely divided solid material with an upwardly moving gasiform fluid, a gasiform fluid distribution baffle comprising a cooling coil disposed horizontally across the flow area of said vessel, said cooling coil comprising a plurality of closely spaced tubular members interconnected with each other to provide a continuous flow path through said tubular members, means for connecting said cooling coil to said vessel and for allowing relative movement between the cooling coil and vessel, a first layer of refractory disposed on said tubular members to be supported by the latter and extending across the flow area of said vessel to divide the latter into a gasiform fluid inlet chamber and a solids contacting chamber, said first layer of refractory being provided with a plurality of spaced openings disposed to communicate with gasiform fluid inlet chambers between said spaced tubular members, a second layer of refractory superimposed on said first layer of refractory and comprising a plurality of sections removable from said first layer of refractory, said second layer having a plurality of passageways therein each of which register with an opening of said plurality of openings in said first layer of refractory to thereby provide for flow of gasiform fluid from said gasiform fluid inlet chamber into said solids contacting chamber, said first layer of refractory being adapted to loosely engage said tubular members to permit relative movement of said tubular members with respect to said first layer of refractory, said cooling coil being connected to receive cooling fluid from a source thereof for flow of cooling fluid through said tubular members to absorb heat from said first layer of refractory, said cooling coil having an outlet to discharge heated cooling fluid therefrom.

4. The apparatus of claim 3 wherein said first layer of refractory comprises a plurality of refractory bricks each of which is provided with at least one arcuate cutout in the under surface thereof adapted to contact the upper peripheral surface of the tubular members of said cooling coil.

5. The apparatus of claim 3 wherein said second layer of refractory comprises a plurality of refractory bricks each of which has a reduced body portion receivable in an opening in said first layer of refractory and Venturi-shaped passageway extending therethrough.

6. In a vessel for contacting a mass of finely divided solid material with an upwardly moving gasiform fluid, a gasiform fluid distribution baffle comprising, a cooling coil disposed horizontally across the flow area of said vessel, said cooling coil comprising a plurality of closely spaced parallel metallic tubular members interconnected at their ends to the next adjacent tubular member to provide for series flow of fluid therethrough, means for connecting said cooling coil to said vessel and for allowing relative movement between the cooling coil and vessel, a refractory floor positioned on said cooling coil and in engagement with the vessel walls to divide the vessel into a gasiform fluid inlet chamber and a solids contacting chamber, said refractory floor having a plurality of closely spaced vertically extending passageways communicating with the fluid inlet chamber and the solids contacting chamber to provide for flow of gasiform fluid from said fluid inlet chamber into the solids contacting chamber, a first metallic tubular support assembly disposed in contact with said tubular members of the cooling coil and extending transversely of the longitudinal axes of said tubular members, said tubular support assembly communicating at one end to a source of cooling fluid to receive the same and at the opposite end with said cooling coil to deliver cooling fluid to the latter and a second metallic tubular support assembly spaced from said first tubular support assembly and in contact with said tubular members of said cooling coil and disposed to extend transversely of the longitudinal axes of said tubular members, each of said first and second tubular assemblies having a plurality of spaced pendant leg portions, each pendant leg portion being connected to the bottom of said vessel, said second tubular support assembly communicating at one end to said cooling coil to receive cooling fluid from the latter and having an outlet to discharge cooling fluid therefrom.

7. In a vessel for contacting a mass of finely divided solid material with an upwardly moving gasiform fluid, a gasiform fluid distribution baffle comprising, a cooling coil disposed in a horizontal plane in said vessel, said cooling coil comprising a plurality of closely spaced parallel tubes connected together at their ends by return bends to provide serial flow of fluid through the tubes, means connecting said cooling coil at each return bend to the vessel wall to support said tubes and to allow relative expansion of said tubes with respect to said vessel, a refractory floor positioned on and supported by the tubes of said cooling coil and connected to the vessel wall in a fluid-tight manner to divide the vessel into a solids contacting chamber and a gasiform fluid inlet chamber, said floor being adapted to loosely engage said tubes to allow for differential expansion between said tubes and said floor, said refractory floor having a plurality of spaced vertical openings disposed to communicate with the solids contacting chamber and the gasiform fluid inlet chamber between the tubes of the cooling coil for providing flow of gasiform fluid from the gasiform fluid inlet chamber into the solids contacting chamber, said cooling coil having an inlet communicating with a source of cooling fluid to receive the same for flow through said tubes for absorbing heat from said refractory floor, said cooling coil having an outlet to discharge heated cooling fluid, a tubular support assembly comprising a plurality of spaced hollow post members closed at both ends and connected to the bottom of said vessel, said hollow post members being interconnected by a plurality of inverted L-shaped pipes, an inverted L-shaped pipe being disposed with its vertical leg extending coaxially within a post member and in spaced relationship with the interior surface and bottom of said post member and its horizontal leg secured to the next adjacent post member and in communication with the interior thereof, said post members and inverted L-shaped pipes being dimensioned so that the pipes contact the tubes of said cooling coil to support the latter, one of said post members being connected to a source of cooling fluid to receive the same for flow through the post members and inverted L-shaped pipes, the inverted L-shaped pipe associated with the post member connected to a source of cooling fluid being provided with an outlet to discharge heated cooling fluid.

8. In a vessel for contacting a mass of finely divided solid material with a gasiform fluid, a gasiform fluid distribution baffle assembly comprising, a metallic tubular grid disposed horizontally in said vessel in spaced relationship with the bottom of said vessel, a hollow support assembly having horizontal portions and spaced pendant leg portions connected to the bottom of said vessel, said horizontal portions and said pendant leg portions being dimensioned so that said horizontal portions contact said tubular grid inwardly of the ends of the latter to support the tubular grid, a refractory floor disposed on and supported by said tubular grid to divide the vessel into a gasiform fluid inlet chamber and a solids contacting chamber, said refractory floor being provided with a plurality of spaced openings communicating the solids contacting chamber with the gasiform fluid inlet chamber to provide flow of gasiform fluid from the latter into the solids contacting chamber, said tubular grid having an inlet communicating with a source of cooling fluid to receive cooling fluid for flow through said tubular grid for absorption of heat from said refractory floor, said tubular grid having an outlet to discharge heated cooling fluid.

References Cited in the file of this patent

UNITED STATES PATENTS

| 2,436,157 | Westling | Feb. 17, 1948 |
| 2,614,034 | Brummerstedt | Oct. 14, 1952 |
| 2,628,157 | Kuhn | Feb. 10, 1953 |
| 2,789,034 | Swaine et al. | Apr. 16, 1957 |